Aug. 30, 1960 K. SENCKEL 2,950,706
METHOD AND DEVICE FOR MIXING GASOLINE AND AIR IN
CYLINDERS OF INTERNAL COMBUSTION ENGINES
Filed Feb. 3, 1956 2 Sheets-Sheet 1
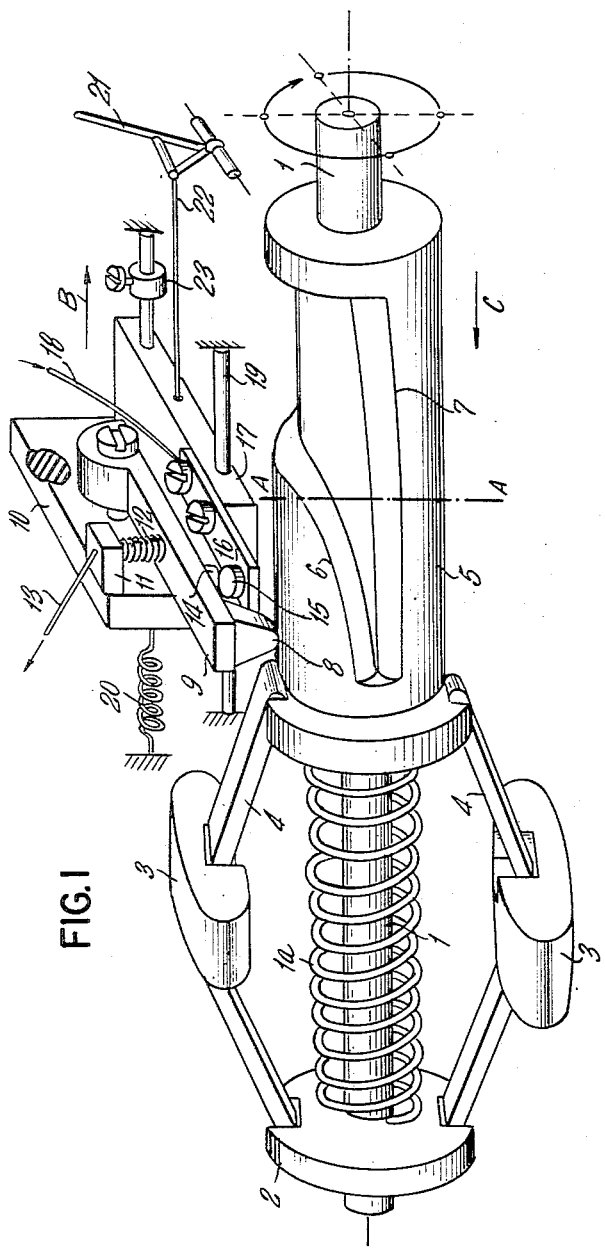
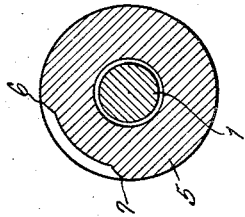
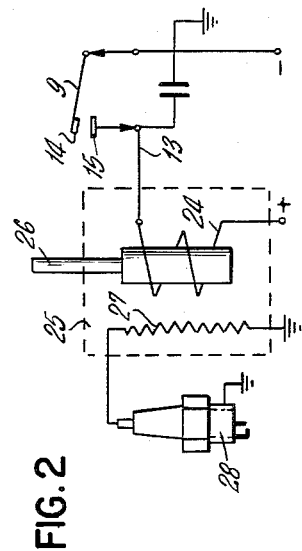
INVENTOR.
KARLHEINZ SENCKEL
BY
AGT.

Aug. 30, 1960 K. SENCKEL 2,950,706
METHOD AND DEVICE FOR MIXING GASOLINE AND AIR IN
CYLINDERS OF INTERNAL COMBUSTION ENGINES
Filed Feb. 3, 1956 2 Sheets-Sheet 2

INVENTOR.
KARLHEINZ SENCKEL
BY
AGT.

United States Patent Office 2,950,706
Patented Aug. 30, 1960

2,950,706

METHOD AND DEVICE FOR MIXING GASOLINE AND AIR IN CYLINDERS OF INTERNAL COMBUSTION ENGINES

Karlheinz Senckel, Prinzenstrasse 31, Munich, Germany

Filed Feb. 3, 1956, Ser. No. 563,399

7 Claims. (Cl. 123—32)

The present invention relates to a method and device for mixing gasoline and air, and for igniting this mixture in cylinders of internal combustion engines provided with an injection device and external ignition, and relates as well to an arrangement for driving and controlling the injection device and to the ignition of the gas-air mixture in cylinders of internal combustion engines having an injection device and external ignition.

One of the objects of the present invention is to unite the essential advantages of the diesel engine and the Otto carburetor engine into an internal combustion engine with an injection device and external ignition, without transferring any of the disadvantages of the mentioned Otto or diesel engine. The combustible gas-air mixture is compressed in the conventional Otto carburetor engine and ignited by means of a spark plug. This combustion depends largely on the quality of the mixture. For the purpose of a perfect combustion, each gasoline particle should be surrounded by the required number of oxygen particles at the instant of firing. That would be the ideal goal. The advantage of a good intermixture of gas and air is a considerable increase in the speed of combustion and a decrease in the combustion time. In this event the combustion does not last beyond an unallowed crank angle even at a maximum number of revolutions. Heretofore the revolutions per minute of an Otto engine were not limited for reasons of combustion. But it is extremely difficult to obtain a simultaneous measured quantity of injected fuel and air as a function of the accelerator position, of the load, revolutions and of the temperature. Moreover, the danger exists at a cold start, that the injected gas would partially sweep off the oil film from the cylinder wall, when fuel injection starts close to the bottom dead center of a revolution.

The Otto carburetor engine itself also has a number of disadvantages. One of the most important disadvantages is a relatively low efficiency. For example, the thermal efficiency of an Otto engine is approximately 30–35%, whereas the diesel engine reaches a thermal efficiency of about 45%. The reason is well known, being the greater compression achieved in the diesel engine. The compression ratio $\epsilon$ of the Otto engine does not normally exceed 5 to 7 as against the diesel engine compression ratio $\epsilon$ of 16 to 20. It should be observed that the total efficiency at $\epsilon$ 4 to 16 rises rapidly but beyond that ratio it remains nearly the same due to increasing friction. It would be obvious to increase the compression for improving the efficiency of the Otto engine. But this aim meets with difficulty due to the need for a mixture which is very readily ignitable. At increased compression, the mixture would cause self-ignition prematurely and knocking would ensue.

In the diesel engine this spontaneous ignition is avoided by injecting the fuel just before the end of the compression. There is no qualitative gasoline and air mixing conducted, but the injection takes place quantitatively, i.e., the diesel process operates with excess air and gains the advantages of better cooling and CO-free combustion and, for that reason, the combustion lasts longer. This fact causes a limitation of revolutions per minute in the diesel engine.

Another advantage of the invention consists in improved acceleration of an internal combustion engine provided with the new device. Moreover, less gasoline consumption and a more flexible operation are gained, particularly at low numbers of revolutions per minute.

Additional features and advantages of the invention will be understood from the consideration of the following detailed description, taken in connection with the attached drawings, forming a part of this specification, and in which several embodiments of the invention have been shown by way of illustration. However, it is pointed out that the invention is not confined to any strict conformity with the showing in the drawings, but may be changed or modified so long as such changes or modifications constitute no material departure from the salient features of the invention as expressed in the appended claims.

In the drawings, in which similar or identical parts are referred to by the same reference numerals:

Fig. 1 is a diagrammatic view of an electrically controlled device embodying the invention;

Fig. 2 is a wiring diagram;

Fig. 3 is a detail, on an enlarged scale, taken along section A—A of Fig. 1;

Figure 5:
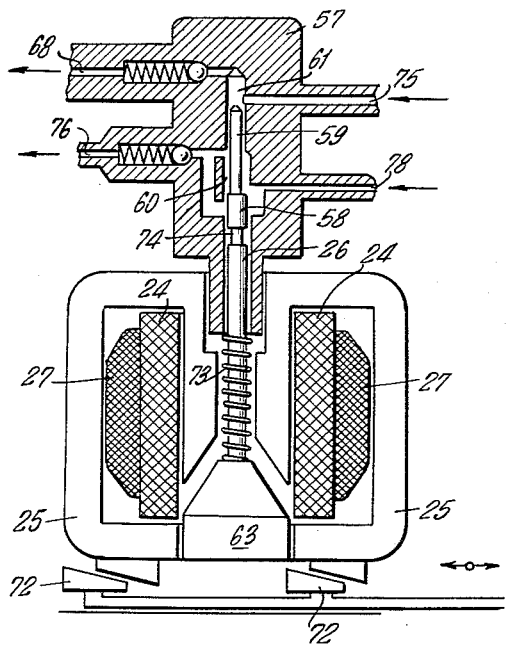
Fig. 5 is a section of the electromagnetically driven injection pump.

First of all a method will be described for mixing fuel and air, and how to ignite the mixture in cylinders of internal combustion engines with an injection device and external ignition. In this system, combustion takes place with excess air in the cylinder and is conformed to the corresponding load and numbers of revolutions per minute. At increased load and rate of revolutions the start of injection is progressively advanced and begins about at the top dead center of a revolution and extends over the whole compression stroke with qualitatively improved mixture of fuel and air. The ignition and the end of the injection are covered on the basis of time cycle over the total range of load and rate of revolutions. The air for the combustion is, as usual, drawn through the intake duct and then compressed in the combustion chamber. As long as the engine runs in the low speed range or with part throttle, the injection is performed during the cycle close to the top dead center of the revolution. Thereby only a poor mixing is accomplished between the air of combustion and the injected fuel. But with increased rate of revolutions and load, the fuel is always injected sooner. This causes a qualitative increase in the fuel-air ratio growing up to the maximum of revolutions per minute. At this maximum point, the injection of fuel into the combustion chamber starts at the beginning of the compression stroke or, in two-stroke engines, even a little sooner.

In this manner diesel-engine-like behaviour is obtained with regard to the charge at low revolutions and, at a faster run, the fuel-air charge becomes more similar to that of the Otto engine. This is particularly good for full load, but on the other hand, under partial load the characteristics remain quite similar to those of the diesel over the entire speed range of the engine. Of course, the mixture is improved whenever the engine speeds up. The diesel-like characteristic can therefore be safely maintained, since the amount of injection in the low range is so little that it can ignite fast enough even at maximum rate of revolutions. In any case, excess air can be used without regard to the load and speed. In this manner, the compression can be considerably improved without danger of self-ignition, as even at maximum advanced start of injection no satisfactory and completely ignitable formation of gas-air mixture is available.

On the other hand, the charge is so well mixed, that after ignition by the spark plug combustion occurs rapidly enough. Indeed, any objectionable ignition delay, as in the diesel process, should be reduced as much as possible. That result is attained by the timely coordination of ignition and end of injection over the total load and speed range of the engine.

The drawings explain such embodiments for the performance of the described method. All these embodiments have in common means for energy storage located between the internal combustion engine and an injection pump. The required force for actuating the piston of the injection pump is picked up from the energy storage. This energy storage means may be of an electrical type, such as a battery in connection with an electro-magnet, or it may be of a mechanical type, such as for example, a spring. By means of such an energy storage unit it is possible to specify the beginning and the end of the injection by merely releasing and blocking the force arbitrarily. After the liberation, the force works freely till a blocking under constant physical conditions. From this fact it may be concluded that the ratio between the amount of injection and injection time is always the same. Therefore, the adjustment may be performed by merely changing the stroke of the pump piston, i.e., an earlier release of the blocking force for the purpose of increasing the amount of injection. Thus, the released force works over a longer period of time and may be extended over the total compression stroke even on valve-controlled two-stroke engines exceeding the total compression stroke.

This procedure is reduced to practice by advancing the releasing action by means of the accelerator. Along with this, the release is simultaneously accomplished by a centrifugal governor or like device when the number of revolutions increases, and in this manner the injection process becomes more extended.

This extension can be accomplished only so far until the optimum number of revolutions per minute is reached and so long as no throttling effect of fresh air appears. A dog limits the centrifugal governor, avoiding a further advanced releasing action when the optimum number of revolutions per minute is exceeded. However, after the end of injection is further advanced in connection with the ignition, the injection is reduced at the predetermined crank angle and is coordinated with the air charge, decreased by the throttling effect.

The following devices embodying the invention are more particularly explained according to the attached drawings:

In one form of the invention illustrated by Figs. 1 through 4, the thrust plate 2 of a centrifugal governor is mounted on a cam shaft 1, and is directly or indirectly driven by the cam shaft. The tension members 4, holding the flyweights 3, are connected with a cam drum 5, which is axially slidable on the cam shaft 1. A return spring 1a is located between the thrust plate 2 and the cam drum 5. A release cam 6 and a blocking dog 7 are carved into the cam drum 5, as more clearly seen in Fig. 3.

Figure 4:
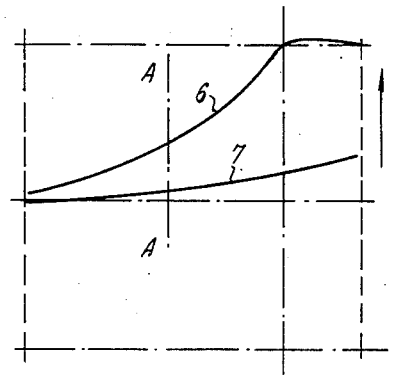
Fig. 4 is the development of a cam shape.

As shown in Fig. 4, the blocking dog moves along a slightly sloping path. The release cam 6 follows nearly a logarithmical curve, but ends in a line parallel to the cam shaft 1 (Fig. 4).

Fig. 3 is an enlarged transverse section of the cam drum 5. For purposes of clarity the slope of the curves are shown somewhat exaggerated.

The electrically insulating or non-conducting finger 8 of a contact arm 9 rests on the cam drum 5. The free end of contact arm 9 is swingably arranged in an electrically insulating support or socket 10, and is under action of a compression spring 12, which abuts against a nose 11 of the insulating socket 10. An electrical line 13 is connected with this nose 11. The contact arm 9 carries on its underside one contact 14 of a switch or circuit breaker. The other contact 15 is fixed to a contact plate 16, which is mounted on the horizontal portion 17 of the insulating socket 10. An electrical line from contact plate 16 is connected to a power source (not shown in Fig. 1).

The horizontal portion 17 of the insulating socket 10 is shiftably held to move parallel to the cam shaft 1 by means of guide bars 19. The movement of the insulating socket 10 is performed against the force of a return spring 20 by means of an accelerator 21, controlled by a lever system or by a cable line 22. A stop 23, mounted on guide bars 19, limits the control motion.

As shown in Fig. 2, the electrical line 13 leads to the winding 24 of an electromagnet 25, serving as an armature, in which the pump piston 26 of an injection pump is inserted. The winding 24 serves simultaneously as a solenoid field coil and also as the primary winding of the ignition coil. The secondary winding 27 is electrically connected with the spark plug 28.

The operation may be briefly described as follows:

The cam shaft 1, as well as the cam drum 5, makes either one-half turn (in a four-stroke engine) or one full turn (in a two-stroke engine) during one engine revolution. During one rotation of the cam shaft the insulating finger 8 slips over the release cam 6, further down over the slope to the lowest possible point and closes the switch contacts 14, 15. A current then flows through the primary winding 24 and excites the electro-magnet 25. The pump piston 26 is thus impelled ahead and injects fuel into the cylinder chamber. After a short time in relation to the engine cycle, the insulating finger 8 runs up the slope against the blocking dog 7 and again opens the contact points 14, 15. The flow of current through the primary winding 24 of the electromagnet 25 is interrupted again, and the forward motion of the pump piston 26 is completed. At the same time an impulse voltage is induced in the secondary winding 27. This potential impulse is used for the production of a spark in the spark plug 28.

Thus, the end of the injection and the firing point always coincide with each other. By the current interruption, the field collapses very rapidly, and the motion of the pump piston 26 is thereby favorably and instantaneously restrained. Upon actuation of the accelerator 21, the insulating socket 10 with its horizontal projection 17 moves in the direction of arrow "B," according to Fig. 1. Due to the early deviation from a horizontal line, the release cam 6 causes, at its increased displacement, an advance in the starting point of the injection. Since the blocking dog 7 is slightly inclined, the actuation of the accelerator 21 causes the displacement of the injection-end in conformity with the firing point, and a spreading of the injection action is thus also obtained. As rate of revolutions increases, the centrifugal governor pulls the cam drum 5 in the direction of arrow C (Fig. 1). The injection-start will be still further advanced until the optimum number of revolutions per minute ($n_{optimum}$) is reached. Beginning from this point up to the maximum number of revolutions per minute ($n_{max}$), the curve of release cam 6 again extends horizontally (Fig. 4), but the injection-end, together with the ignition point, will be still more reduced. Moreover, the amount of fuel injection will be decreased, as the throttling effect necessitates a reduced air charge.

Figure 6:
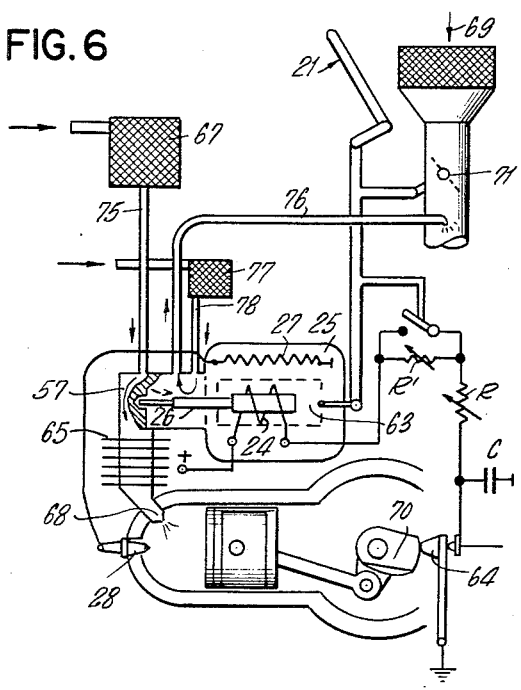
Fig. 6 is a diagrammatic view of an internal combustion engine with an electromagnetically controlled injection pump.

Figs. 5 and 6 show an electromagnetically controlled injection pump which may be used in connection with the novel system.

In Fig. 5 the pump body 57 has a bore in which operate steps 58 (lower part) and 59 (upper part) of the stepped piston 26. The piston and the bore form two pump chambers, namely, chamber 60 for low pressure feed of lubricant, and chamber 61 for high pressure feed of fuel. The first or upper piston step 59 controls the fuel supply and the second or lower step 58 controls the lubricating oil. The first piston stage is shaped needle-like with a diameter of 5 mm. or 0.1968", but preferably 2–3 mm. or 0.0787"–0.118" in diameter. The lubricant feed stage is only 3/10 mm. or 0.0118" thicker than the fuel feed stage. The two-stepped piston 26 is therefore relatively light in weight. This is essential for the proper operation of an electromagnetically driven pump piston.

Due to the small manufacturing tolerances of the piston 26, some fuel leakage is unavoidable, but such leakage will be forced down from the high-pressure chamber 61 and be absorbed by the lubricating oil in the chamber 60. There is no need for a return pipe line to carry the leakage fuel back into the gasoline tank.

Since the lubricating oil has to be under a somewhat low pressure, there can be practically no oil leakage from the lubricating chamber 60 into the magneto chamber. Moreover, between 58 and 26 in the drawing, an annular groove 74 is arranged, which equalizes the oil pressure in chamber 60 with the oil pressure in the intake duct after a short time under pressure of both.

The piston 26 is electromagnetically driven, and a magneto system serves for this purpose. This consists of a magnet body 25, and an armature, into which an extension of the piston 26 is inserted. A magnet coil 24 is wound within the magnet body 25. A spring 73, set against the pump body 57, brings the piston 26 back up to the original position.

The adjustment of the amount of injected fuel is, for example, performed by changing the piston stroke of the fuel pump. The oil quantity should be approximately constant at each stroke in order to guarantee satisfactory lubrication. For this purpose, the shank of the piston 26 is provided with a return bore (not shown) and with a control edge on the above described annular groove 74 so that, beginning from a certain minimum length of stroke, the amount of oil retained in groove 74 is independent of the piston diplacement.

As may be seen in Fig. 6, the electromagnetic actuation of the injection pump allows the installation of the injection pump at arbitrary locations in the engine, particularly very close to the cylinder head. Thus, the body of the engine and the pump jets 68 may be combined into one structural unit. In this way the main disadvantage of all present mechanically controlled pumps is removed, namely, the need for relatively long high-pressure lines between the pump and the nozzles for jets. The nozzles 68 are maintained at low temperature by means of cooling fins 65, or by other cooling means. It is undesirable to allow the nozzles 68 to be heated up by a hot cylinder head.

In Figs. 5 and 6 a mechanical governor for the fuel quantity is also shown. By the movement of a wedge or inclined key 72, the total magnet system is lifted or lowered relative to the pump body 57.

Since, on the whole, the injection should be completed at the firing point (Otto engine), the current should be interrupted at this moment. The collapsing magnetic field produces a considerable voltage impulse in the magnet winding 24 quite similar to the voltage in the primary winding of the ignition coil in the moment of interruption. Thus, it is feasible to integrate the magnet winding 24 with a secondary winding 27 of the ignition coil. Since the internal resistance of this ignition coil 27 is remarkably lower than in the former ignition coils, and since much more energy is available with a more favorable reliability of operation, a decidedly stronger magnetic field of the new ignition coil is achieved than was possible heretofore.

The cylinder charge of an engine with fresh gas, respectively mixed with air, depends, as is known, upon the number of revolutions per minute of the engine. The charge decreases, first slowly, then rapidly, by the resistance to flow and other factors. The time of charge lowering may be defined as the time-constant of gas-changing T.

The magnet system of the injection pump of the present invention operates in accordance with such a time-constant through an electrical time-constant created by the self-induction L and the resistance R. The resistance R consists of the winding resistance of the field coil 24, the line resistance of the conductor, and includes the transfer resistance of the switch contacts with other effects. It is possible to influence this time-constant by adding further resistors R and R', respectively (Fig. 6).

Within a certain time, conforming to the electrical time-constant, the magnet system is capable of pulling the piston 26 completely through its designated path. Therefore, the injection charge remains constant. However, the switch-on time becomes shorter, conforming to the electrical time-constant, so that the fuel delivery decreases. It may therefore be seen that the adjustment of the electrical time-constant is able to follow the curve of the fuel supply amount as well as the curve of the air supply which takes a course depending on the revolutions per minute. It is thus possible to adapt the fuel supply rate to the necessary requirements.

At low engine speeds or revolutions per minute the contact time becomes longer than the injection time of fuel supply needed and therefore more current to the contacts would be required. At low rates of rotation it is therefore necessary to control the electrical contact 64 (Fig. 6) in such a way, that the contact time, independent of the rate of revolutions, remains approximately constant. This is true for the range of revolutions below time-constant T.

The electrical contact 64 is so governed by the cam 70, which is synchronously working with the engine crankshaft that the contact 64 always breaks at the piring point. The same normal requirements have to be fulfilled as in former ignition systems, except that the electrical contact 64 has to be designed heavier to allow for the higher current consumption. A known type centrifugal governor may also be used. However, for keeping the current rate constant independent of the rate of rotation at low revolutions per minute, cam 70 is provided which may have several parts or cam surfaces and whose particular parts are rotatably arranged relative to each other. Each cam part covers the other at low rotations, but they diverge from the idle position when the rate of rotation increases, so that the angle of rotation at which the current flows increases. This may also be performed by the same governor which controls the moment of contact and thus also the ignition point in the engine cycle.

The electrical condenser C, indicated in Fig. 8, serves to produce a high-voltage spark, in the known types of ignition systems.

In Fig. 6 the operation of the injection pump is illustrated in connection with a two-stroke engine. The fuel passes through a filter 67 and through the intake duct 75 into the pump body where, at each power stroke of the pump piston 26, the fuel is brought into the jet 68 under a high pressure. The lubricating oil flows through a filter 77 and through line 78 into the oil step 58 of piston 26. Any fuel leakage enters into the oil chamber and is injected from there into the air intake duct through the line 76 in common with the lubricating oil. The current going through the exciting winding 24 is governed by the cam 70 in such a manner that it is interrupted soon before the top dead center of the engine cycle. Due to the high injection pressure and because of the great energy loss of the pump piston, the injection stops almost immediately after the current flow is interrupted. For this reason and due to the short pressure line to the jet, any after-injection of fuel is almost completely avoided. Undesirable influences, such as those formerly caused by the velocity of fluids in high-pressure pipes, are nearly suppressed.

The resistors R, R' operate as the governor of the time-constant at high rates of revolution as well as at the idling speed.

The form of the cylinder head is hemispherical as represented in Fig. 6. However, practical considerations may require a more favorable shape, particularly one which conforms better to the emission shape of the fuel jet. Thereby the ignition spark always meets a combustible mixture at the edge of the fuel jets, even when considerable excess air is in the cylinder. If special cylinder head-form is used, any appreciable deviation from the nominal value of the mixture will not lead to a diminution of performance at low engine speeds. For reasons of magnetic considerations, the piston 26 must not be of magnetizable material, since it is exposed in the magnetic field 25 within the armature 63. An austenitic corrosion resisting steel is recommended. The sheet metal forming the field of the magnet, should be designed in such a manner that it does not cause unnecessary delay of the electrical time constant. Sheet metals of high resistance and fine laminations are preferred. Moreover, the armature 63, forming only one construction element with the pump piston 26, is preferably conically shaped just as is the cooperating magnet body 25. An advantageous acceleration is achieved by this form, while the excitation of the electromagnet is accomplished.

Various changes and modifications may be made without departing from the spirit and scope of the present invention and it is intended that such obvious changes and modifications be embraced by the annexed claims.

Having thus described the invention, what is claimed as new and desired to be secured by Letters Patent, is:

1. In a process for mixing fuel and air and igniting the mixture thereof in cylinders of an internal combustion, piston-driven engine which is equipped with fuel injection means and with external ignition means; the steps of forwardly shifting the start of introduction of the fuel by said injection means at increased load and relatively high rate of revolutions approximately from the top dead center position of the engine piston progressively toward the beginning of the compression stroke of said engine piston, and concluding the introduction of the fuel by said injection means to coincide with the firing point of the external ignition means, thereby reducing objectionable ignition delay.

2. In an internal combustion engine having a combustion chamber; a mechanism for introducing fuel into said combustion chamber at predetermined times and over a predetermined period of injection in relation to the cycle of said engine and means for igniting said fuel during said period of injection; comprising a cam shaft arranged to be driven by said engine, a cam drum rotatable with said cam shaft and axially slidable on said cam shaft and provided with a first cam surface and a second cam surface, speed governor means connected for rotation with said cam shaft and with said cam drum for causing axial movement of said cam drum in relation to said cam shaft according to variations in speed of rotation of said cam shaft, a support mounted for linear movement parallel to the longitudinal axis of said cam drum, accelerator means for inducing said linear movement in said support, a cam contacting arm pivotally mounted on said support and provided with an electrically insulated finger for following said first and second cam surfaces on said cam drum, electrical contact means on said cam contacting arm and on said support for opening and closing an electrical circuit for igniting said fuel at a predetermined instant according to the shape of said first and second cam surfaces, respectively and according to their relative position during said cycle as determined by the rotational position of said cam shaft and by the longitudinal position of said cam drum moved by said speed governor means, and pump means also actuated by said electrical contact means for injecting fuel into said combustion chamber at predetermined times and over a predetermined period in relation to said cycle of said engine.

3. A mechanism according to claim 2, said speed governor means comprising first thrust plate means fixed for rotation with said cam drum and slidable on said cam shaft, second thrust plate means fixed for rotation with said cam shaft and spaced apart from said first thrust plate means along said cam shaft, spring means disposed between said first and second thrust plate means urging same apart, and a plurality of flyweights hingeably attached to each of said first and second thrust plate means for moving same closer together and against said urging of said spring means in accordance with any increase in rotational speed of said cam shaft, whereby said cam drum will be moved longitudinally with respect to said cam shaft in accordance with the rate of revolution of said engine.

4. A mechanism according to claim 2, said pump means including an axially movable pump piston, electromagnetic means surrounding at least a portion of said pump piston for causing said axial movement therein, a first winding for exciting said electromagnetic means and connected in series with said electrical contact means on said contacting arm and on said support, said first winding also being adapted to serve as a primary winding of an ignition coil, said means for igniting said fuel including a spark plug, a second winding adapted to be electrically connected to said spark plug in said combustion chamber and located in proximity to said first winding so as to serve as a secondary ignition coil therewith, whereby upon closing of said contacts said pump piston will be moved axially within said electromagnetic means and inject fuel into said combustion chamber only during such movement, then terminating the injection of fuel instantaneously upon separation of said contacts.

5. A control system for the fuel-air mixture and its ignition in internal combustion engines; comprising a driven rotating cam shaft, a governor coaxial with said cam shaft and operatively connected thereto, cam means rotatable with said cam shaft, said cam means being slidably seated on said cam shaft and adjacent and connected to said governor permitting said governor to thereby displace said cam means relative to said cam shaft, said cam means including a first cam and a second cam, an insulating support, make and break circuit means selectively operatively connectable with said cam means and mounted on said insulating support, and accelerator lever means connected to said insulating support for moving said insulating support and cooperating with said governor for regulating the position of said insulating support and hence said make and break circuit means relative to said cams to condition the opening and closing of said make and break circuit means relative to the position of said cams, said first cam in cooperation with said make and break circuit means causing the start of a fuel injection operation, whereas said second cam causes through cooperation with said make and break circuit means the conclusion of said fuel injection operation.

6. A system according to claim 5, said make and break circuit means including an insulating support, electric contact pieces forming a switch and mounted for movement relative to each other on said insulating support, one of said contact pieces being provided with an extension forming a finger of electrically insulated material, said finger being engageable with said cam means, respectively, guide means slidably conducting said insulating support substantially parallel to the axis of said cam shaft and lengthwise of said cam means, and means interconnecting said insulating support with said accelerator lever means.

7. A system according to claim 5, including means for biasing said governor from said cam means.

References Cited in the file of this patent

UNITED STATES PATENTS

| | | |
|---|---|---|
| 1,059,604 | Gaff | Apr. 22, 1913 |
| 1,134,537 | Hutches | Apr. 6, 1915 |
| 1,580,489 | Hunt | Apr. 13, 1926 |
| 1,903,381 | Kennedy | Apr. 4, 1933 |
| 2,005,063 | Wild et al. | June 18, 1935 |
| 2,306,950 | Jacoby et al. | Dec. 29, 1942 |
| 2,598,754 | Booth | June 3, 1952 |
| 2,724,371 | Mallory | Nov. 22, 1955 |